United States Patent [19]

Rieth et al.

[11] 4,104,917
[45] Aug. 8, 1978

[54] TROLLING WIRE

[75] Inventors: James E. Rieth, 2315 Okemos Dr. SE., Grand Rapids, Mich. 49506; Charles J. Steffens, Wyoming, Mich.

[73] Assignee: James E. Rieth, Grand Rapids, Mich.

[21] Appl. No.: 759,171

[22] Filed: Jan. 13, 1977

[51] Int. Cl.² ............................................. G01K 7/00
[52] U.S. Cl. ................................... 73/343 R; 174/108
[58] Field of Search .................. 73/362 R, 343 R, 344, 73/170 A; 174/108, 110 FC

[56] References Cited

U.S. PATENT DOCUMENTS

| 1,861,851 | 6/1932 | Gilbert | 174/108 |
| 2,106,060 | 1/1938 | Ostrander | 174/108 |
| 2,741,126 | 4/1956 | Anderson et al. | 73/344 |
| 3,351,706 | 11/1967 | Gnerre | 174/108 X |
| 3,485,101 | 12/1969 | Lindberg et al. | 73/343 R |
| 3,889,049 | 6/1975 | Legg et al. | 174/108 X |
| 3,922,808 | 12/1975 | Rieth et al. | 73/170 A X |
| 4,000,653 | 1/1977 | Booth et al. | 73/343 R |

Primary Examiner—Richard C. Queisser
Assistant Examiner—Joseph W. Roskos
Attorney, Agent, or Firm—Price, Heneveld, Huizenga & Cooper

[57] ABSTRACT

A trolling reel for raising and lowering a weighted trolling wire having a temperature responsive element electrically coupled to the end thereof incorporates a small diameter trolling wire comprising an outer conductive sheath made of several strands of stainless steel wire surrounding an insulating layer positioned between the stainless steel sheath and a coaxially aligned center conductor. The trolling wire so formed provides a relatively high tensile strength wire for the weighted trolling line as well as displaying corrosive resistant properties for use in a saltwater environment. The wire also has the desired electrical properties for use in providing a temperature readout of the location of the end of the trolling line.

15 Claims, 4 Drawing Figures

TROLLING WIRE

BACKGROUND OF THE INVENTION

The present invention relates to improved trolling apparatus and particularly to a trolling wire therefor.

When trolling in relatively deep waters, it is desirable to use a trolling line with a heavy weight to hold the end of the line at a desired depth. Typically a fishing line is releasably coupled to the trolling line to maintain a fishing lure at the desired depth while trolling and provide normal play of the line once the fish strikes and the line separates from the trolling line. Recently electrically driven trolling reels have been developed, one such apparatus being described in detail in U.S. Pat. No. 3,922,808 issued on Dec. 2, 1975 and assigned to the present assignee.

As is well known, many species of fish prefer known temperature waters and the trolling apparatus described in the above identified patent incorporates a trolling line which is an electrical conductor permitting the mounting of a temperature responsive element at the end thereof for reading the temperature of the water. U.S. Pat. No. 3,916,555 issued Nov. 4, 1975 and assigned to the present assignee, also discloses a trolling apparatus utilizing such an arrangement together with a two conductor cable employed as the trolling line.

Considerable difficulty, however, has been encountered using commercially available or even specially made cables in the trolling apparatus environment. Since the cable can extend to 200 feet or even more, it must be of a relatively small diameter to fit on a compact trolling reel suitable for the sport fisherman. On the other hand, the tensile strength must be relatively high since there are significant tension forces on the line when it is payed out a significant distance and especially if the line snags. Also and particularly in saltwater, the wire tends to become short circuited due to the seepage of water between the conductors of the cable. With prior art cable, the addition of an outer insulating and protective jacket causes the cable to be relatively bulky and unsuitable for use in a compact trolling apparatus. Prior art cable frequently had an outer diameter of about 0.080 inches and yet a tensile strength of only 100-125 pounds.

SUMMARY OF THE INVENTION

The present invention overcomes the difficulties encountered by the prior art by providing a relatively small diameter trolling wire which employs as one conductor a strong electrically conductive material such as multiple strand stainless steel forming the outer sheath for the wire and a single coaxially aligned center conductor insulatively supported within the outer sheath by a suitable insulating material.

It has been discovered that such construction provides both the desired tensile strength and small diameter required for trolling wires as well as displaying the necessary electrical properties permitting the utilization of a temperature responsive device coupled to the control line at one end and at the opposite end to a temperature display circuit. Further, the wire provides the durability and imperviousness required for use in fresh or saltwater.

These and other advantages, features, and objects of the present invention can best be understood by referring to the following description thereof together with the drawings in which:

DETAILED DESCRIPTION OF THE PREFERRED EMBODIMENT

Figure 1:
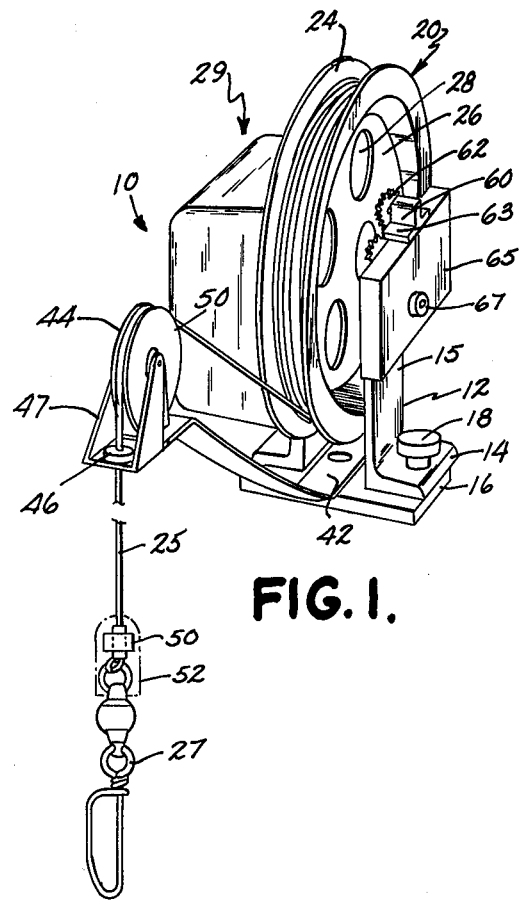
FIG. 1 is a perspective view of the trolling apparatus incorporating the present invention.

Referring to FIG. 1, there is shown a reel assembly 10 including a frame 12 to which is rotatably mounted a line reel 20 and a reel drive unit 29. The frame 12 includes a base 14 including a pair of spaced vertically extending arms 13 and 15. The base 14 is adapted to be removably secured to a deck plate 16 by means of a pair of threaded bolts 18. The deck plate 16 in turn is secured to the transom or gunwale of a vessel by means of lugs (not shown). This mounting arrangement permits easy removal of the reel assembly when not in use.

Reel 20 includes a central spindle 22 which is secured to a reel shaft rotatably supported between arms 13 and 15 by means of a pair of bearings fitted into the arms near the top. The shaft extends at one end into the reel drive unit 29 including a reversible drive motor to be rotatably driven thereby. The reel 20 is of ABS having a circumference of approximately 2 feet with a channeled perimeter 24 for holding a trolling wire 25 incorporating the present invention therein. A web 26 extends between spindle 22 and channel 24 of the reel and includes a plurality of spaced apertures 28 which serves both to reduce the material cost of the reel and provide means for coupling wire 25, an electrical conductor, to the frame of the reel assembly as described in detail in the above identified U.S. Pat. No. 3,922,808, the disclosure of which is incorporated herein by reference.

The reel assembly includes a flexible action arm 40 secured at one end 42 to base 14 of frame 12 and extending outwardly and upwardly therefrom supporting a guide wheel 44 at the opposite end thereof. A guide bushing 46 is mounted in a pivot bracket 47 pivotally attached to the axle of wheel 44. Wire 25 is anchored at one end to the reel 20 and extends from the reel over guide wheel 44 and through bushing 46 where it is positioned over the edge of the boat for lowering into the water. The free end of wire 25 includes a temperature sensing means 50 such as a thermistor electrically coupled to the wire 25 and potted in an insulative material 52 (shown in phantom in FIG. 1) to prevent electrical shorting of the thermistor or other water damage. Mechanically coupled to the end of wire 25 is a clip 27 for connecting the line to a weight (not shown) for holding the wire end at a selected depth in the water.

The reel assembly 10 further includes a revolution counter 60 which has a shaft geared to the shaft of the reel by means of a counter gear 62 engaged by a counter drive gear 64 secured to the shaft of the reel. A suitable bracket 63 mounts counter 60 to arm 15. Counter 60 is a commercially available unit to provide a readout representative of the revolutions of the counter shaft. Since the reel diameter and ratio of gears 62 and 64 is known, the counter 60 readout is directly related to the number of feet of wire 25 payed out from reel 20. Counter 60 is mounted to the reel frame by bracket 63. Below bracket 63 there is a slip ring assembly 65 which is employed to couple trolling wire 25 to an output jack 67. Jack 67 and slip rings 65 thus permit coupling of the thermistor 50 to the digital display circuit shown in FIG. 4.

Attached to frame arm 13 is the reel drive unit 29 which provides powered drive for the reel 20 and is self-braking such that once the line has been payed out or retrieved a desired length, the drive is deactivated and secures the reel without requiring separate reel braking means. The reel drive unit 29 includes a reversible direct current electric motor having a drive coupled to the reel shaft.

Although the preferred embodiment employs an electric motor for powering the reel, it is to be understood that a hydraulic or pneumatic motor with suitable control valves in place of the field windings could also be employed. Also the reel can be manually rotated.

Figure 3:
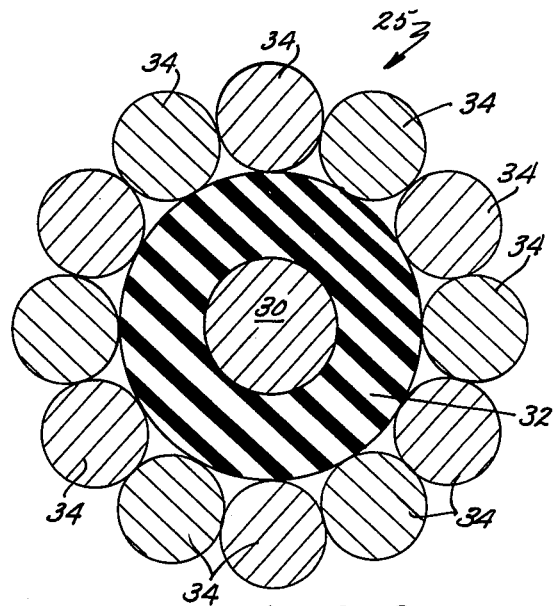
FIG. 3 is a cross-sectional view of the wire taken along section lines III—III of FIG. 2.
Figure 2:
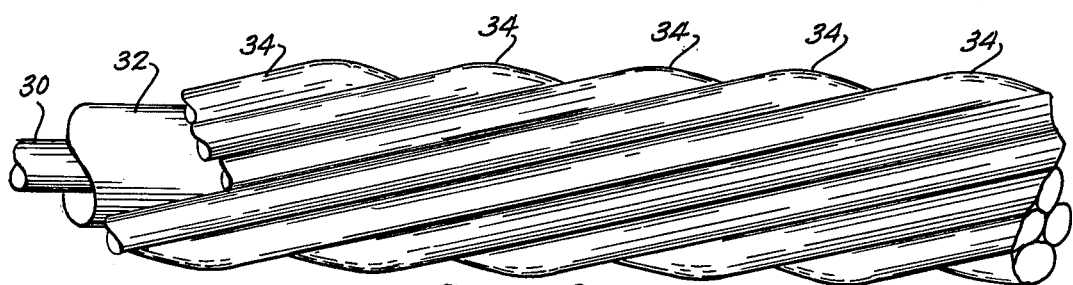
FIG. 2 is a greatly enlarged, fragmentary view of the trolling wire embodying the present invention.

Referring now to FIGS. 2 and 3, the improved trolling wire employed with the trolling apparatus shown in FIG. 1 is descirbed in greater detail. The trolling wire comprises a center conductor 30 made of a suitable conductive material such as copper which is silver plated and preferably has a diameter of approximately 0.009 inches. Surrounding the center conductor 30 is an annular longitudinally extending insulating layer 32. Insulating layer 32 comprises, in the preferred embodiment, a TEFLON ® (i.e. a fluorocarbon polymer) layer having a thickness of approximately 0.004 inches ±0.002 inches tolerance. Although Teflon is employed and provides excellent flexibility, durability and resistance to water and particularly saltwater, other insulating materials such as vinyl or the like could be employed.

Spirally wound around insulator 32 and conductor 30 with a lay of 1:7 are eleven type 302 stainless steel conductors 34 having a diameter of 0.007 inches +0.001 inches, −0 inches tolerance to define the outer protective sheath of the trolling wire. The overall outer diameter of the resultant wire is about 0.032 inches plus or minus a few thousandths and has a tensile strength of at least 150 pounds, although the preferred embodiment tested has a tensile strength of approximately 180 pounds. The leakage resistance between center conductor 30 and outer conductor 34 is at least one megaohm at 200 volts.

The cable is manufactured in a conventional wire forming process to tightly spiral wind the outer stainless steel sheath around the center conductor and insulating layers to form the relatively small diameter trolling wire (i.e. less than 0.050 inches in diameter) with the desired strength and durability.

Figure 4:
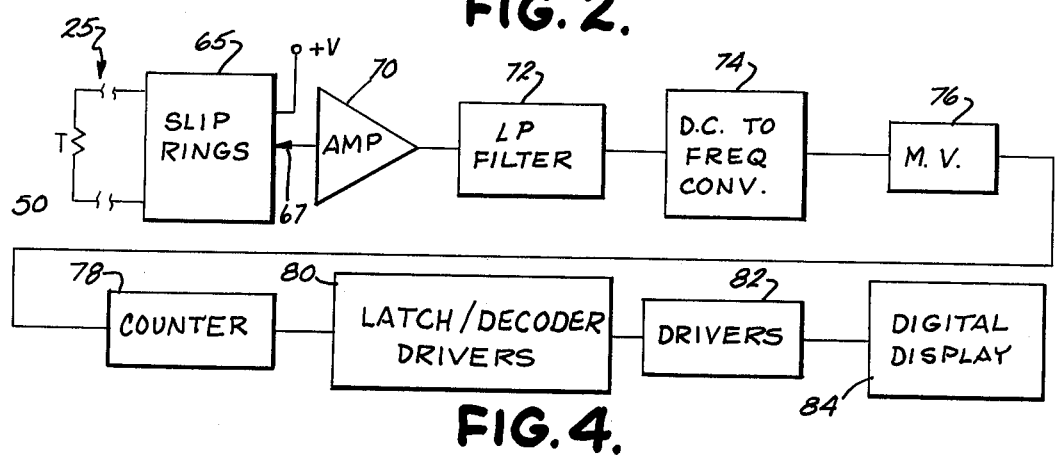
FIG. 4 is a block electrical circuit diagram of the temperature display circuit.

As seen in FIG. 4, thermistor 50 shown in FIG. 1 is coupled to the slip ring assembly 65 by the trolling wire 25 while one output of slip rings 65 is coupled to the input of an operational amplifier 70 by means of jack 67 and a suitable interconnecting cable. The slip ring assembly 65 also couples a supply voltage +V to the thermistor. Amplifier 70 amplifies the time varying DC signal from thermistor 50 and includes a gain potentiometer (not shown) for calibration of the thermistor at a reference temperature such as 32° F. The output of amplifier 70 is coupled to the input of a low pass filter 72 which filters out any noise frequency or other higher frequency spurious signals while permitting the transmission of the temperature representative time varying DC Signal to the input of a DC-to-frequecy converter 74 coupled to the output of the low pass filter.

Circuit 74 includes an integrator and a DC comparator which responds to the time varying DC signal to provide a saw-tooth output signal whose frequency is directly related to the voltage level of the input and therefore, representative of the temperature sensed by thermistor 50. The saw-tooth signal is applied to a free-running multi-vibrator circuit 76 which responds to the signals to generate a plurality of output pulses in response to the frequency varying input saw-tooth signals, the number of which are directly related to the temperature sensed by thermistor 50. Circuit 76 also includes a delay, one-shot multi-vibrator coupled to the free-running multi-vibrator and providing reset pulses to the subsequent counter circuit 78.

Circuit 78 includes a dual binary coded decimal counter and a pair of BCD-to-seven segment latch decoder driver circuits, all of which are commercially available in integrated circuits coupled as a two stage (units and ten digits) BCD counter. The output of counter 78 is coupled to the input of a latch /decoder and drive circuit 80 which provides storage and decoding of the end count. Circuit 80 drives the power drivers 82 which constitute fourteen high current transistors (seven for each of the two digits employed in the temperature display) having their output coupled to the display circuits 84. The display constitutes a seven element LED display commercially available and providing a two digit readout of the temperature sensed by thermistor 50.

In operation, the fisherman lowers the weighted trolling wire and accompanying releasably attached fishing line by actuating the motor drive unit 29 of the trolling apparatus shown in FIG. 1. Unit 29 includes a switch (not shown) for this purpose. Once the desired temperature range has been reached as indicated by the digital display 84, the reel drive is deactuated thus holding the fishing lure at the desired temperature range. With the improved trolling wire of the invention, a significant length of wire can be wound on reel 20 to reach depths up to or even in excess of 200 feet where required. The conductivity of the strong stainless steel outer shield is sufficient for use as one conductor coupling the thermistor to the temperature displaying circuit shown in FIG. 4. By eliminating the two center conductor type of cable employing an insulating outer jacket used in the past, therefore, the wire of the present invention is greatly reduced in diameter and increased in strength.

It will become apparent to those skilled in the art that various modifications to the preferred embodiment of the invention described and disclosed herein can be made by those skilled in the art without departing from the spirit and scope of the invention as defined by the appended claims.

The embodiments of the invention in which an exclusive property or privilege is claimed are defined as follows:

1. For use in a deep trolling apparatus including a reel for raising and lowering a weighted wire with temperature detection means at one end to be immersed in water and temperature display means at the opposite end, an improved trolling wire extending between the detection and display means comprising:
   a center conductor;
   an insulating layer surrounding said center conductor; and
   an outer conductor shield made of a plurality of strands of stainless steel, wherein the outer diameter of said outer shield is less than 0.050 inches.

2. The wire as defined in claim 1 wherein said outer conductor shield is spiral wound.

3. The wire as defined in claim 2 wherein said outer conductor shield comprises about eleven strands of stainless steel each having a diameter of about 0.007 inches and having a lay of about 1:7.

4. The wire as defined in claim 3 wherein said center conductor has a diameter of about 0.009 inches.

5. The wire as defined in claim 4 wherein said insulating layer is made of a flurocarbon Polymer and is about 0.004 inches thick.

6. A trolling apparatus comprising a support for a trolling reel, a trolling reel rotatably mounted to said support, a trolling wire coupled at one end to said reel for storage thereon, temperature detection means coupled to said wire at an opposite end, and means coupled to said wire for displaying the detected temperature, wherein the improvement comprises:
said wire including a center conductor;
an insulating layer surrounding said center conductor; and
a spirally wound, multiple strand outer conductor sheath of stainless steel wherein said center conductor, said insulating layer and said outer sheath are dimensioned such that the outer diameter of said wire is less than about 0.050 inches.

7. The wire as defined in claim 6 wherein said outer conductor shield comprises about eleven strands of stainless steel each having a diameter of about 0.007 inches and having a lay of about 1:7.

8. The wire as defined in claim 7 wherein said center conductor has a diameter of about 0.009 inches.

9. The wire as defined in claim 8 wherein said insulating layer is made of a fluorocarbon Polymer and is about .004 inches thick.

10. A trolling apparatus comprising:
a support for a trolling reel;
a trolling reel rotatably mounted to said support;
a trolling wire coupled at one end to said reel for storage thereon said wire including a center conductor, an insulating layer surrounding said center conductor, and a spirally wound, multiply strand outer conductor sheath of stainless steel wherein said center conductor, said insulating layer and said outer sheath are dimensioned such that the outer diameter of said wire is less than about 0.050 inches;
temperature detection means coupled to said wire at an opposite end; and
means coupled to said wire for displaying the detected temperature.

11. The apparatus as defined in claim 10 wherein said display means comprises a digital display.

12. The apparatus as defined in claim 11 wherein said outer conductor shield comprises about eleven strands of stainless steel each having a diameter of about 0.007 inches and having a lay of about 1:7.

13. The apparatus as defined in claim 12 wherein said center conductor has a diameter of about 0.009 inches.

14. The apparatus as defined in claim 13 wherein said insulating layer is made of a flourocarbon Polymer and is about 0.004 inches thick.

15. A trolling apparatus comprising a support for a trolling reel, a trolling reel rotatably mounted to said support, a trolling wire coupled at one end to said reel for storage thereon, temperature detection means coupled to said wire at an opposite end, and means coupled to said wire for displaying the detected temperature, wherein the improvement comprises:
said wire including a center conductor of about 0.009 inches diameter;
an insulating layer about 0.004 inches thick surrounding said center conductor; and
a spirally wound, multiple strand outer conductor sheath of stainless steel wire each strand being about 0.007 inches in diameter and wound such that the overall diameter of said wire does not exceed 0.050 inches and the tensile strength of said wire is greater than 150 pounds.

* * * * *

UNITED STATES PATENT AND TRADEMARK OFFICE
CERTIFICATE OF CORRECTION

PATENT NO. : 4,104,917
DATED : August 8, 1978
INVENTOR(S) : James E. Rieth, et al It is certified that error appears in the above-identified patent and that said Letters Patent are hereby corrected as shown below:

Column 3; line 19:
   "descirbed" should be --described--

Column 5; line 8:
   "Polymer" should be --polymer--

Column 5; line 32:
   "Polymer" should be --polymer--

Column 6; line 1:
   "multiply" should be --multiple--

Column 6; line 20:
   "Polymer" should be --polymer--

Signed and Sealed this

Eighth Day of May 1979

[SEAL]

Attest:

RUTH C. MASON
*Attesting Officer*

DONALD W. BANNER
*Commissioner of Patents and Trademarks*